US007898118B2

(12) United States Patent
Nitsche et al.

(10) Patent No.: US 7,898,118 B2
(45) Date of Patent: Mar. 1, 2011

(54) SAFETY SWITCHING APPARATUS AND METHOD FOR SAFELY SWITCHING AN ELECTRICAL LOAD ON AND OFF

(75) Inventors: Thomas Nitsche, Esslingen (DE); Udo Ratey, Eislingen/Fils (DE); Christoph Zinser, Wolfschlugen (DE)

(73) Assignee: Pilz GmbH & Co. KG, Ostfildern (DE)

( * ) Notice: Subject to any disclaimer, the term of this patent is extended or adjusted under 35 U.S.C. 154(b) by 142 days.

(21) Appl. No.: 12/188,259

(22) Filed: Aug. 8, 2008

(65) Prior Publication Data

US 2009/0058197 A1 Mar. 5, 2009

Related U.S. Application Data

(63) Continuation of application No. PCT/EP2007/000644, filed on Jan. 25, 2007.

(30) Foreign Application Priority Data

Feb. 10, 2006 (DE) ......................... 10 2006 007 264

(51) Int. Cl.
*H02H 11/00* (2006.01)
*F16P 3/20* (2006.01)

(52) U.S. Cl. ........................................ 307/326; 307/328

(58) Field of Classification Search .................. 307/328, 307/326
See application file for complete search history.

(56) References Cited

U.S. PATENT DOCUMENTS

| | | | |
|---|---|---|---|
| 4,939,358 A | 7/1990 | Herman et al. | |
| 5,168,173 A | 12/1992 | Windsor | |
| 5,675,227 A | 10/1997 | Roos et al. | |
| 7,548,159 B2 * | 6/2009 | Pullmann et al. .......... | 340/545.1 |

(Continued)

FOREIGN PATENT DOCUMENTS

DE 24 49 725 4/1976

(Continued)

OTHER PUBLICATIONS

EN 954-1; Safety-related parts of control systems; 1996; 34 pages.

(Continued)

*Primary Examiner* — Michael Rutland Wallis
(74) *Attorney, Agent, or Firm* — Harness, Dickey & Pierce, P.L.C.

(57) ABSTRACT

The invention relates to a safety switching apparatus and to a method for safely switching on and off an electrical load, in particular an automated installation. The apparatus comprises a first port for a first signaling element, a second port for a second signaling element, a first switching device coupled to a first switching activator, and a second switching device coupled to a second switching activator. A time monitoring apparatus activates the first and the second switching activators only if a time between an actuation of the signaling elements is smaller than a predetermined maximum duration. The activation of the switching activators in turn causes the switching devices to be switched-through and thus the load to be switched on. For the activation of the switching activators, a first and a second switching element, which are each arranged in series with the switching activators, need to switched-through. According to one aspect of the invention, at least a first microcontroller is provided for the time monitoring, which microcontroller is designed to detect actuations of the signaling elements and to activate the switching elements in the event of the maximum duration being undershot.

14 Claims, 3 Drawing Sheets

U.S. PATENT DOCUMENTS

| | | | | |
|---|---|---|---|---|
| 7,610,119 | B2 * | 10/2009 | Abe et al. | 701/1 |
| 7,672,109 | B2 * | 3/2010 | Nitsche et al. | 361/115 |
| 2007/0182255 | A1 * | 8/2007 | Schneiderheinze et al. | 307/125 |

FOREIGN PATENT DOCUMENTS

| | | | |
|---|---|---|---|
| DE | 30 28 196 | A1 | 2/1982 |
| DE | 36 00 173 | A1 | 7/1987 |
| DE | 42 15 327 | A1 | 11/1993 |
| DE | 43 32 614 | A1 | 3/1994 |
| DE | 44 27 759 | A1 | 2/1996 |
| DE | 199 20 340 | A1 | 11/2000 |
| DE | 203 09 132 | U1 | 9/2003 |
| WO | WO 2005096465 | * | 10/2005 |

OTHER PUBLICATIONS

Pilz; Operating Instructions 21 360-02 PNOZ e2.2p; 2008; pp. 1-12.
Pilz; Operating Instructions 21 368-02 PNOZ e2.1p; 2008; pp. 1-12.
Wieland Electrical Connections; Modular Electronic Safety System; Dec. 2005; 12 pages.

* cited by examiner

SAFETY SWITCHING APPARATUS AND METHOD FOR SAFELY SWITCHING AN ELECTRICAL LOAD ON AND OFF

CROSS-REFERENCES TO RELATED APPLICATIONS

This application is a continuation of international patent application PCT/EP2007/000644, filed on Jan. 25, 2007 designating the United States, which international patent application has been published in German language and claims priority from German patent application DE 10 2006 007 264.2, filed on Feb. 10, 2006. The entire contents of these priority applications are incorporated herein by reference.

BACKGROUND OF THE INVENTION

The invention relates to a safety switching apparatus for safely switching an electrical load, in particular an automated installation, on and off.

The invention further relates to a method for safely switching an electrical load, in particular an automated installation, on and off.

A safety switching apparatus within the meaning of the present invention is any switching apparatus which at least meets category 3, preferably even category 4, of the European standard EN 954-1 or a comparable safety standard. This includes in particular switching devices, safety controllers and sensor and actuator modules which are used for controlling and performing safety-critical functions in the sector of industrial production environments.

In this case, in particular switching devices are known which monitor the operating position of an actuating pushbutton, of an emergency off switch, of a protective door or of any other desired signaling device and disconnect a machine or a machine section as a function of this.

Failure of such safety switching apparatuses can have life-endangering consequences for the machine operating personnel, for which reason safety switching apparatuses are generally only used if they are permitted by the competent regulatory authorities (for example in Germany the Accident Prevention and Insurance Association, "Berufsgenossenschaft").

An application of such a safety switching apparatus is provided, for example, in a two-hand switching device. The function of such switching device is typically to permit the activation of a machine or a machine section only when the operator depresses two pushbuttons. In this case, the pushbuttons are arranged, for example by them being spaced apart from one another in suitable fashion, in such a way that the actuation of the left and the right hand of the operator is required. This is intended to prevent the operator from activating the machine while one of his hands is still in the danger area of the machine.

In order to reduce the possibility of erroneous operation or manipulation of the device, two-hand switching devices are often equipped with a time monitoring apparatus. This time monitoring apparatus sets a further condition for the activation of the machine, namely that only a certain maximum duration should elapse between the actuation of the first and the second pushbutton, more generally the first and the second signaling element. If this maximum duration is exceeded, the machine is not activated even when both pushbuttons have been depressed. This is intended to prevent the operator from depressing the first pushbutton with one hand and impermissibly locking/clamping it and then actuating the second pushbutton with the same hand.

DE 42 15 327 C2 proposes a circuit for a safety switching apparatus. The principle of the two-hand switching system disclosed therein is based on the fact that in each case one capacitor is charged in two channels. If the first pushbutton is now pressed, a first relay is connected. At the same time, the charging operation of the second capacitor is ended by virtue of the capacitor being decoupled from one pole of the supply voltage and being connected to the other pole of the supply voltage via an adjustable potentiometer. In this way, a discharging process of the second capacitor is started. If the second pushbutton is now pressed, the energy remaining in the second capacitor is conducted to a second relay. If only a short amount of time has elapsed, the charge in the capacitor is sufficient for energizing/closing the relay. If, on the other hand, too much time has elapsed, i.e. the capacitor has been discharged to too great an extent, the energy is insufficient for closing the second relay. In this case, the load cannot be switched on.

However, one disadvantage of the proposed circuit is the fact that, under certain circumstances, it is possible for the load to be switched on in undesirable fashion for a short period of time. This is the case, for example, when the capacitor is discharged via the relay although the circuit for supplying the relay, at least temporarily, is not capable of holding the relay in the active position. In this case, the load is switched on and off over a short period of time, which is undesirable both from a safety point of view and from the point of view of the installation.

Furthermore, it is disadvantageous that, as a result of the indirect activation of the relay by means of the capacitor, it is always necessary to match the capacitor, the relay and the potentiometer to one another. In the event of changes in voltage and/or temperature, the matching process needs to be repeated regularly.

Electronic safety switching devices are also available on the market, such as, for example, the products PNOZ e2.1p and PNOZ e2.2p by the present applicant. Since these devices are entirely electronic, the control loops can be defined very precisely and the necessity for matching or calibration can be avoided. Since, in the case of purely electronic solutions, the flow of energy and the switching information are processed separately, however, they require an increased level of complexity in terms of component parts and software.

Against this background, one object of the present invention is to disclose a cost-effective safety switching apparatus and a method for safely switching an electrical load on and off, where the risk of faulty short-term switching-on is avoided and the time monitoring takes place more directly and is subjected to fewer fluctuations even in the case of changing ambient conditions.

BRIEF SUMMARY OF THE INVENTION

According to one aspect of the present invention, there is provided a safety switching apparatus for safely switching on and off an electrical load, in particular an automated installation, comprising a first port for a first signaling element, a second port for a second signaling element, a first switching device coupled to a first switching activator, a second switching device coupled to a second switching activator, and comprising a time monitoring apparatus, which is configured to switch-through said first and second switching devices by activating said first and second switching activators if a time between an actuation of said first signaling element and an actuation of said second signaling element is smaller than a predetermined maximum duration, with a first switching element being connected in series with said first switching activator and a second switching element being connected in series with said second switching activator, wherein said time monitoring apparatus has at least a first microcontroller, which is configured to detect said actuations of said first and second signaling elements and to activate said first and second switching elements when said maximum duration is undershot.

According to a further aspect of the present invention, there is provided a method for safely switching an electrical load on and off, comprising the following steps:

- providing a first signaling element,
- providing a second signaling element,
- providing a first switching device, which is coupled to a first switching activator,
- providing a second switching device, which is coupled to a second switching activator,
- providing a first switching element which is connected in series with said first switching activator,
- providing a second switching element, which is connected in series with said second switching activator,
- detecting a time difference between an actuation of said first signaling element and said second signaling element using a first microcontroller,
- switching-through said first and said second switching devices by activating said first and said second switching activators by a control signal being transmitted by said first microcontroller to said first and said second switching elements, if said time difference is smaller than a predetermined maximum duration.

One particular feature of the invention lies in the fact that electrical and electronic components are combined here in an advantageous manner. Firstly, the flow of energy and the processing of input information, for example "safety circuit closed", take place in a combined manner. This means that the flow of energy by principle always also requires a closed safety circuit. Dedicated monitoring of the safety circuits which are controlled by the signaling elements is therefore not required.

Secondly, the activation of the switching activator, for example a relay, is realized via the same current path in which the signaling element is also present. As a result, the switching activator is prevented from being capable of being switched on in an undesired manner for a short period of time.

The safety-relevant monitoring of the simultaneity, i.e. the time monitoring to ensure that a certain maximum duration is not exceeded between the actuations of the signaling elements, is carried out in the electronic part of the safety switching apparatus with the aid of at least one microcontroller. The time monitoring apparatus can therefore be set very precisely and has only negligible voltage and temperature dependences (or others which are easily compensated for). Switching-on of the switching activator is therefore firstly dependent on whether the safety circuits have been closed by means of the signaling elements, but also secondly on the fact that an unblocking/release via the switching elements is obtained by the microcontroller. An apparatus and a method in accordance with the invention are therefore very reliable.

The use of the microcontroller also opens up the possibility of checking further conditions which need to be met for the electrical load to be switched on in a simple manner. The microcontroller can therefore query the presence of a further signal which is intended to be relevant for activation of the first and the second switching activators, for example.

In a refinement of the invention, a first current path for activating the first switching activator is routed via the first port in such a way that the first port for activating the first switching activator needs to be switched to a low resistance.

This results in a further condition which needs to be met in order to activate the switching activator and therefore to switch on a relay, for example. In other words this means that the current flow must flow both via the first port and via the switching activator in order to enable activation of the first switching activator.

The term "at a low resistance" should in this case be understood to mean that the input resistance which acts from the circuit in the direction of the first port of the first signaling device enables a current which is high enough to activate the switching activator. If the resistance is too high, the resultant current flow is insufficient for activating the switching activator. The term "switching-through" may be understood in the sense of providing electrical continuity, e.g. by closing a contactor or by making a transistor conductive.

It should be noted that, when considering the input resistance, the resistance along the current path via the first port and through the first switching activator needs to be taken into consideration.

As an alternative or in addition, the invention can also provide that the second port for activating the second switching activator needs to be switched at a low resistance.

In a further refinement of the invention, the first signaling element has at least one first normally closed contact and one first normally open contact, with, in the rest state, the first normally open contact being open and the first normally closed contact being closed and, in the activated state, the first current path being routed via the first normally open contact. The term activated state is understood to mean the state when the respective switching activator has been moved over from the rest state to an operating state.

Such an embodiment allows for further safety-relevant checks. Thus, for example, it is possible to check in the rest state whether the normally closed contact is closed. This can take place by means of a voltage measurement, since the first normally closed contact needs to be connected to a certain voltage given a predetermined design. In addition, as soon as the normally closed contact opens, the initiation of an actuation of the first signaling element can be identified and, depending on the desired implementation, the time detection can be started.

The current flow through the switching activator is only possible, however, when the first normally open contact closes. If, in the event of a fault, the first normally open contact does not close, the first switching activator cannot be activated. Since the first normally closed contact and the first normally open contact depend on different voltage potentials, the safety switching apparatus can identify at least three different states:

If a first voltage potential is measured, for example 0 volt, it is possible to draw the conclusion that the normally closed contact is closed. If neither a positive nor a negative current flows into the first port from the safety switching apparatus, this can indicate that either no first signaling element is connected or that an intermediate state is present, in which the first normally closed contact has opened, but the first normally open contact has not yet closed. If, on the other hand, a second voltage potential is detected, for example 24 volts, this makes it possible to draw the conclusion that the first normally closed contact has opened and the first normally open contact has closed.

As an alternative or in addition, it is possible to equip the second signaling element in the same manner with at least one second normally closed contact and one second normally open contact.

In a further refinement of the invention, a first switching indicator is associated with the first switching device and a second switching indicator is associated with the second switching device, with the respective state of said first switching indicator and said second switching indicator being monitored by the first microcontroller in order to determine a discrepancy between an expected state of a switching device and an actual state of this switching device.

This increases safety further. The switching indicators are in this case arranged in particular so as to be positively driven with the respective switching device. This means that the state of the respective switching device can be detected by means of the switching indicators. This is significant in safety terms to the extent that an unexpected state on a switching device can be identified.

If, for example, the first switching activator is deactivated, this should result in the first switching device opening. If, however, it is detected by means of the first switching indicator that the first switching device is still closed, this can be identified as a fault and shutdown can be implemented. In principle, it is also possible to provide only the first or only the second switching device with a switching indicator.

In a further refinement of the invention, the first microcontroller has a monitoring input for signaling a state of the load and for identifying a fault event in the load.

This measure makes it possible to further increase safety. Since information on the state of the load is now present and a fault event in the load can be identified, it is possible to suppress the turning-on of the first and the second switching device, although the safety switching apparatus per se functions without any faults.

A further refinement of the invention contains a redundant, second microcontroller, which is designed to interact with the first microcontroller in such a way that the activation of the first and the second switching activators only takes place when the second microcontroller, too, has determined that the maximum duration has been undershot.

This measure also further improves the safety of the apparatus according to the invention or of the method according to the invention. It would thus be possible, for example, for a defect to occur in the first microcontroller which leads to the first and the second switching activator themselves being activated even when the maximum duration has been exceeded. Such a defect can be identified and eliminated by means of the second microcontroller.

In this case, the first and the second microcontrollers are preferably configured in such a way that they monitor one another and that, in the event of a discrepancy in the evaluation result, activation of the first and the second switching activators is suppressed. If the two microcontrollers are additionally driven by the same signals, a difference in the identification of the received signal can also be identified as a fault and treated correspondingly.

In a further refinement of the invention, a third switching element is connected in series with the first switching activator and a fourth switching element is connected in series with the second switching activator, which switching elements are driven by the second microcontroller.

This is a further aspect for increasing failsafeness. If, for example, a current flow through the first switching activator should now take place, both the first and the third switching elements need to be turned on. If only one of these elements is off, the switching activator cannot be activated and the first switching device is prevented from turning on.

In a further refinement of the invention, the second signaling element has at least one second normally closed contact and a second normally open contact, with, in the rest state, the second normally closed contact being closed and the second normally open contact being open and, in the activated state, the second current path being routed via the second normally open contact, the first normally open contact allowing to make a first connection to a first voltage potential, and the second normally open contact allowing to make a second connection to a second voltage potential.

This refinement thus adds a further safety-relevant aspect by virtue of activation of the switching activators being suppressed in the event of a crossover.

A further refinement of the invention includes a mode selection device for setting an operating mode of the safety switching apparatus as a function of the type of signaling elements.

In a few applications it is sufficient for the signaling devices to be in the form of simple normally open contacts. However, for safety reasons it is advantageous if the signaling devices are in the form of a combination of normally closed and normally open contacts. Since different signaling devices can run through a different sequence of states, the corresponding circuits need to be matched to the signaling device used. The refinement provides the advantageous option of integrating a mode selection device, preferably in the first and/or the second microcontroller, in order to make it possible to match the circuits to various signaling devices in a simple manner.

If a signaling device of the first type (only normally open contact) is used, the mode selection device has the effect that the microcontroller only monitors closing and opening of the normally open contact. If, on the other hand, a signaling device of the second type (combination of normally closed and normally open contacts) is used, the microcontroller can perform this monitoring both for the normally closed contact and for the normally open contact of the signaling element. As a result, faults in the operating sequence can be determined and plausibility checks can be carried out.

In one refinement of the invention, the first microcontroller is designed to detect the type of signaling elements.

In this way, on the one hand the configuration of the mode selection device can be carried out in a simple manner. Secondly, it is also possible, however, to carry out a plausibility check for the adjustment carried out. Thus, for example, a configuration process could be required prior to the first use of the electrical load, and this configuration process requires actuation of the signaling elements.

If the microcontroller determines, for example, the states “high resistance”, “voltage potential” and “high resistance”, it is possible to conclude that a signaling device of the first type is connected at the monitored port. If, on the other hand, for example, the sequence “first voltage potential”, “high resistance” and “second voltage potential” results, this is an indication of the fact that a signaling device of the second type has been depressed. This information can now be used to set the operating mode or, if the operating mode has been predetermined in another way, to check the operating mode.

It is understood that the abovementioned features and those features which are yet to be explained below can be used not only in the respectively given combination, but also in other combinations or on their own, without leaving the scope of the present invention.

BRIEF DESCRIPTION OF THE SEVERAL VIEWS OF THE DRAWINGS

Exemplary embodiments of the invention are illustrated in more detail in the drawing and are explained in more detail in the description below. In the drawing.

DESCRIPTION OF PREFERRED EMBODIMENTS

Figure 1:
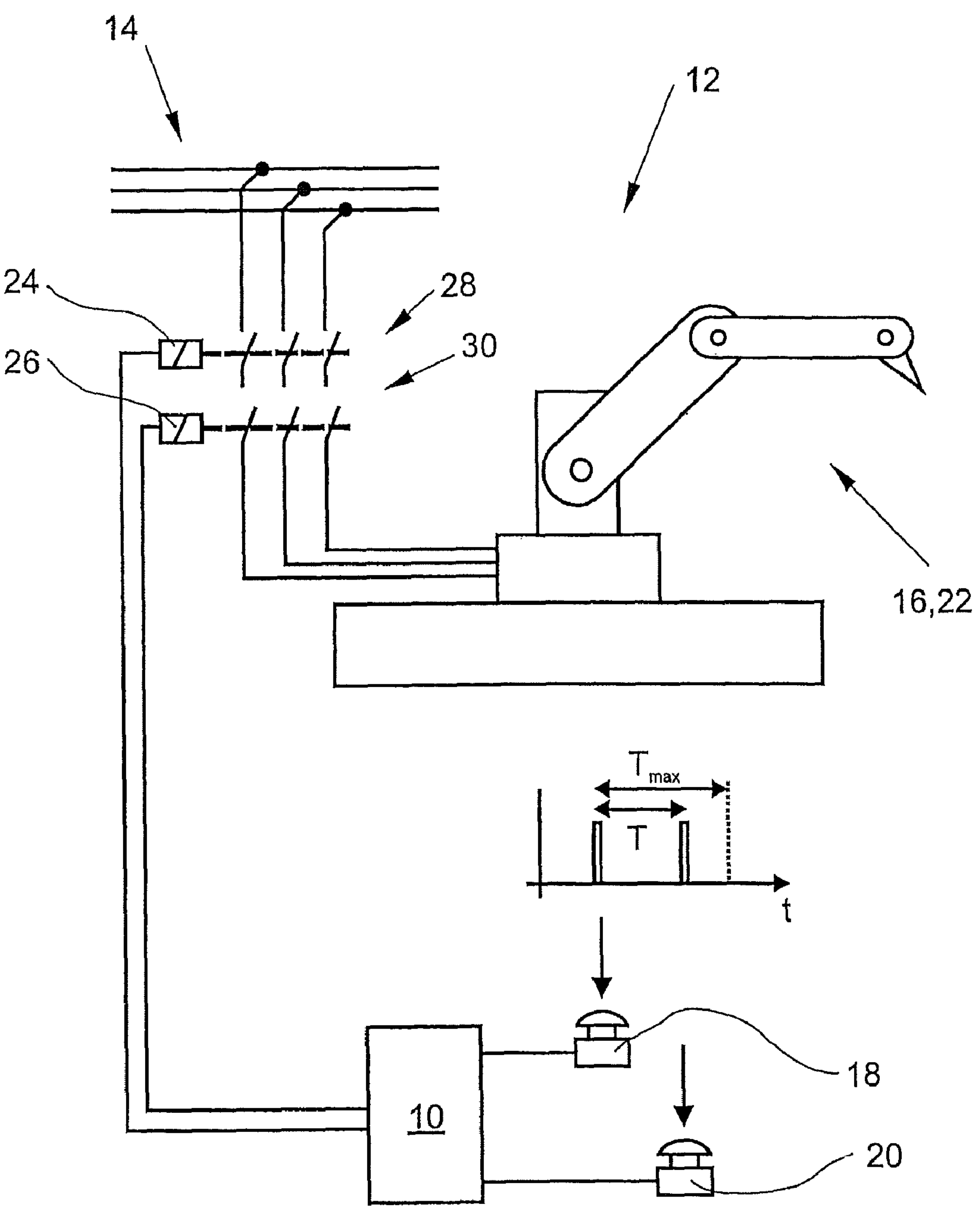
FIG. 1 shows an example of a design of an apparatus with a safety switching apparatus.

In FIG. 1, a construction with the novel safety switching apparatus 10 is denoted in its entirety by the reference numeral 12. The construction 12 in this case contains a power supply 14, a machine 16 and the safety switching apparatus 10, to which a first signaling device 18 and a second signaling device 20 are connected.

The machine 16 is a load 22, which can only be switched on for a working operation when the time span T between an actuation of the first signaling element 18 and an actuation of the second signaling element 20 is below a predetermined maximum duration $T_{max}$.

In order to switch the machine 16 on, the safety switching apparatus 10 drives two contactors 24, 26, whose working contacts 28, 30 are arranged so as to be connected between the power supply 14 and the machine 16. The machine 16 can only carry out the working operation when both contactors 24, 26 close their working contacts 28, 30.

If a fault is identified prior to or during the actuation of the signaling elements 18, 20, at least one of the contactors 24, 26 does not engage. As a result, the machine 16 remains without current. If a fault is identified once the working contacts 28, 30 have been connected, the power supply to the machine 16 can be disconnected by the disengagement of at least one of the contactors 24, 26.

A preferred exemplary embodiment of the safety switching apparatus 10 is described below. In this case, the same reference symbols denote the same elements as before.

Figure 2:
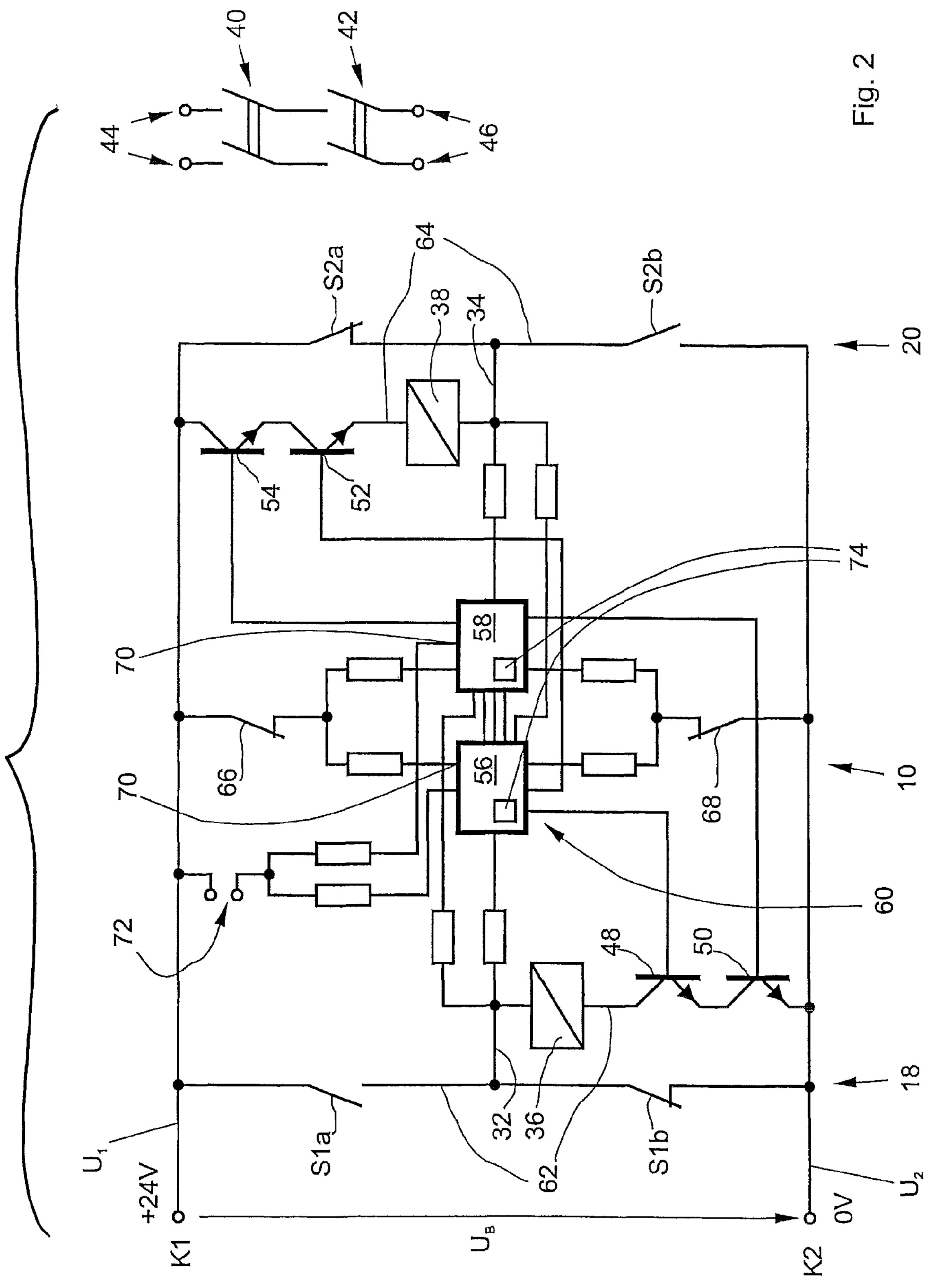
FIG. 2 shows the basic design of a safety switching apparatus with two signaling devices.

FIG. 2 shows the simplified circuit diagram of a safety switching apparatus 10. At a first port 32, the first signaling element 18, which has a first normally open contact S1*a* and a first normally closed contact S1*b*, is connected. The first normally open contact S1*a* is connected, on one of its sides, to the normally closed contact S1*b* at the first port 32. On its other side, the first normally open contact S1*a* is connected to a first voltage potential $U_1$ of a first terminal K1. The normally closed contact S1*b*, on the other hand, is connected to a second voltage potential $U_2$ of a second terminal K2. At a second port 34, the second signaling element 20 is connected. The second element 20 has a second normally open contact S2*b* and a second normally closed contact S2*a*, which are connected to one another on one of their respective sides at the second port 34. On the respective remaining side, the second normally open contact S2*b* is connected to the second voltage potential $U_2$ of the second terminal K2, and the second normally closed contact S2*a* is connected to the first voltage potential $U_1$ of the first terminal K1.

The safety switching apparatus 10 has a first switching activator 36 and a second switching activator 38. In this exemplary embodiment the switching activators 36, 38 are each in the form of a coil of a relay. The first switching activator 36 interacts with a first switching device 40, and the second switching activator 38 interacts with a second switching device 42. If the first switching activator 36 has a sufficiently high current flowing through it, the switching device 40 closes. If the second switching activator 38 has a sufficiently high current flowing through it, the switching device 42 closes. Only when the two switching devices 40, 42 are closed can a current flow between the output terminals 44, 46.

A first switching element 48 and a third switching element 50 are connected in series with the first switching activator 36. For a current flow through the first switching activator 36, it is therefore absolutely necessary that both the first switching element 48 and the third switching element 50 are turned on. This applies in corresponding fashion to a second switching element 52 and a fourth switching element 54, which are connected in series with the second switching activator 38.

The switching elements 48, 50, 52, 54 are in this case in the form of transistors. In this case, the first switching element 48 and the second switching element 52 are driven at the respective base by a first microcontroller 56. The third switching element 50 and the fourth switching element 54 are driven at their respective base by a second microcontroller 58. The microcontrollers 56, 58, as well as the wiring for the microcontrollers 56, 58, are designed to be redundant in order to be able to identify faults.

The microcontrollers 56, 58 are part of a time monitoring apparatus 60, which is designed to cause the first and the second switching devices 40, 42 to turn on by activating the first and the second switching activators 36, 38 only when a predetermined maximum duration is undershot between an actuation of the first signaling element 18 and an actuation of the second signaling element 20.

If the first and the third switching elements 48, 50 are turned on, a first current path 62 can be created via the first switching activator 36. In order that such a first current path 62 can be produced, it is necessary for the first port 32 to be switched at a low resistance. This means that, when viewed from the first switching activator 36 in the direction of the first port 32, the first port 32 should not be open (at a high resistance) since otherwise no or insufficient current flow can be provided through the switching activator 36. Instead, a low-resistance element needs to be connected at the first port 32, in this case the first normally open contact S1*a*. Simply turning the first and the third switching elements 48, 50 on is therefore insufficient for establishing the first current path 62.

The particular feature of this solution can be identified in particular when an alternative scenario is considered, in which the second switching activator 36 is not connected to the first port 32 but is connected directly at the voltage potential of the terminal K1. In this case, a first current path 62 would be established whenever the first and the third switching elements 48, 50 turn on. The first current path 62 could therefore result independently of the state of the first port 32.

Accordingly, the same situation also results for a second current path 64, which could flow through the second switching activator 38 once the second and the fourth switching elements 52, 54 have turned on. In this case, the second port 34 needs to be switched to a low resistance, which in this case takes place by means of the second normally open contact S2*b*.

The safety switching apparatus 10 also has a first switching indicator 66, which is associated with the first switching device 40, and a second switching indicator 68, which is associated with the second switching device 42.

The function of the switching indicators 66, 68 will be explained with reference to the first switching indicator 66.

For normal operation it is assumed that the first switching device 40 is closed when the first current path 62 is in existence, and that the first switching device 40 is open when the first current path 62 is interrupted.

In the event of a fault, however, situations may occur where the first switching device 40 remains open despite the existence of a first current path 62 or else the first switching device 40 remains closed despite an interruption of the first current path 62.

A possible solution for identifying such a fault event is the first switching indicator 66, which is coupled directly to the first switching device 40. The state of the first switching device 40 can therefore be determined by means of the state of the switching indicator 66.

In the exemplary embodiment shown, the configuration is selected in such a way that the first switching indicator 66 is only closed when the first switching device 40 is actually open. If at least one of the microcontrollers 56, 58 detects that the expected switching state of the switching device 40 deviates from the switching state which has been determined by means of the first switching indicator 66, this would be identified as a fault event and treated correspondingly.

The preceding statements can also be transferred accordingly to the second switching indicator 68.

In addition to the mentioned possibilities of determining a fault within the safety switching apparatus 10, the safety switching apparatus 10 shown has a further mechanism for fault identification. For this purpose, the first and the second microcontrollers 56, 58 each have a monitoring input 70. The monitoring inputs 70 are connected to a control connection 72, to which a signal output of the electrical load 22 can be connected. The fault-free operation of the load 22 is indicated through the microcontrollers 56, 58 by a dedicated signal or a dedicated signal level.

In the exemplary embodiment shown, the microcontrollers 56, 58 expect that the electrical load 22 will provide an electrical connection at the control connection 72, and this electrical connection will produce a voltage level at the monitoring input 70 which returns to the first voltage potential $U_1$ at the terminal K1. If the expected voltage level is lacking, a fault can be assumed and the switching devices 40, 42 remain opened or are opened.

A further particular feature of the safety switching apparatus 10 shown are the mode selection devices 74, which are in this case integrated in the microcontrollers 56, 58. By means of the mode selection devices 74 it is possible to set an operating mode of the safety switching apparatus 10. The operating mode can in this case be set in particular as a function of the type of signaling elements 18, 20.

Before the operation of the mode selection device 74 is explained, first the general function of the safety switching apparatus 10 will be described.

In the rest state, the safety switching apparatus 10 appears as illustrated in FIG. 2. The normally open contacts S1*a*, S2*b* and the switching devices 40, 42 are open. The normally closed contacts S1*b*, S2*a* and the switching indicators 66, 68 are closed. The switching elements 48, 50, 52, 54 are off. An operating voltage $U_B$ is present between the terminals K1 and K2. It is assumed here by way of example that the terminal K1 is at a first voltage potential $U_1$ of +24 volts and the terminal K2 is at a second voltage potential $U_2$ of 0 volt. It is also assumed that the load 22 is not signaling a fault and therefore a conducting connection is provided at the control connection 72.

In order to switch the load 22 on, it is now assumed that the operator first actuates the signaling element 18. This first of all leads to the first normally closed contact S1*b* opening and subsequently the first normally open contact S1*a* closing.

From the point of view of the microcontrollers 56, 58, this means that the first port 32, at which, in the rest state, a voltage of 0 volt is applied, is initially at a high resistance, since the first normally open contact S1*a* and the second normally closed contact S1*b* are open at the same time. Once the first normally open contact S1*a* has closed, a voltage of 24 volts is then present at the first port 32.

At the same time, the first port 32 has now reached a low resistance value with respect to the current path 62 since the first normally open contact SI a only represents a low resistance. This state of the first port 32 does not occur if only the first normally closed contact S1*b* is closed, since the first normally closed contact S1*b* is not in the first current path 62.

This sequence or part of this sequence is identified by the microcontrollers 56, 58 as the complete actuation of the signaling element 18 and the beginning of the time measurement. Although there is now already a voltage of 24 volts present at the first switching activator 36, the first current path 62 remains interrupted, since the first and the third switching elements 48, 50 are still off.

The actuation of the second signaling element causes first the second normally closed contact S2*a* to open and subsequently the second normally open contact S2*b* to close. At the second port 34, there is accordingly the sequence 24 volts, high resistance, 0 volt.

At the same time, the second port 34 has now reached a low resistance value in relation to the current path 64, since the second normally open contact S2*b* only represents a low resistance. This state of the second port 34 would not occur if only the second normally closed contact S2*a* is closed, since the second normally closed contact S2*a* is not in the second current path 64.

This sequence is known by the microcontrollers 56, 58 as the complete actuation of the second signaling element 20, and the time measurement is ended. If the duration which has elapsed between the beginning and the end of the time measurement is below a defined maximum duration, the microcontrollers 56, 58 switch the switching elements 48, 50, 52, 54 through.

The switching elements 48, 50, 52, 54 being turned on results in the first current path 62 being closed by the first switching activator 36 and the second current path 64 being closed by the second switching activator 38. The activation of the switching activators 36, 38 in turn causes the switching devices 40, 42 to close and the switching indicators 66, 68 to open. The load 22 is therefore switched on and can perform its working operation.

As soon as the operator of one of the signaling elements 18, 20 no longer actuates it, the first normally open contact SI a and/or the second normally open contact S2*b* opens, which in turn directly interrupts the first and/or the second current path 62, 64. This in turn results in the switching devices 40, 42 opening and the load 22 being disconnected.

It is noted that this disconnection takes place independently of a response of the microcontrollers 56, 58 and independently of the state of the switching elements 48, 50, 52, 54. Since the microcontrollers 56, 58 register the missing actuation of at least one signaling device 18, 20, however, the switching elements 48, 50, 52, 54 are turned off again. Furthermore, the switching indicators 66, 68 can now be queried and, if a switching device 40, 42 should still be closed, a fault can be signaled.

By way of summary, details will again be given of two particular features of the safety switching apparatus 10 shown.

Firstly, the safety switching apparatus 10 shows a particularly advantageous combination of electrical and electronic components. The respective current path 62, 64 is realized via a switching activator 36, 38 and corresponding switching elements 48, 50, 52, 54. The time monitoring apparatus 60, on the other hand, has an electronic construction and therefore provides high precision. The combination of the relatively inexpensive and at the same time reliable electrical construction with the electronic time monitoring apparatus 60 makes possible a safety switching apparatus 10 with a very good price/performance ratio.

Secondly, the safety switching apparatus 10 provides a particularly high degree of safety by virtue of the fact that, for the switching devices 40, 42 to close, a closed current path 62, 64 via the first normally open contact S1*a* or the second normally open contact S2*b* is always required. This means that even in the case of an enable signal applied to the switching elements 48, 50, 52, 54, the load 22 cannot be switched on if the normally open contacts S1*a*, S2*b* are not closed.

Figure 3:
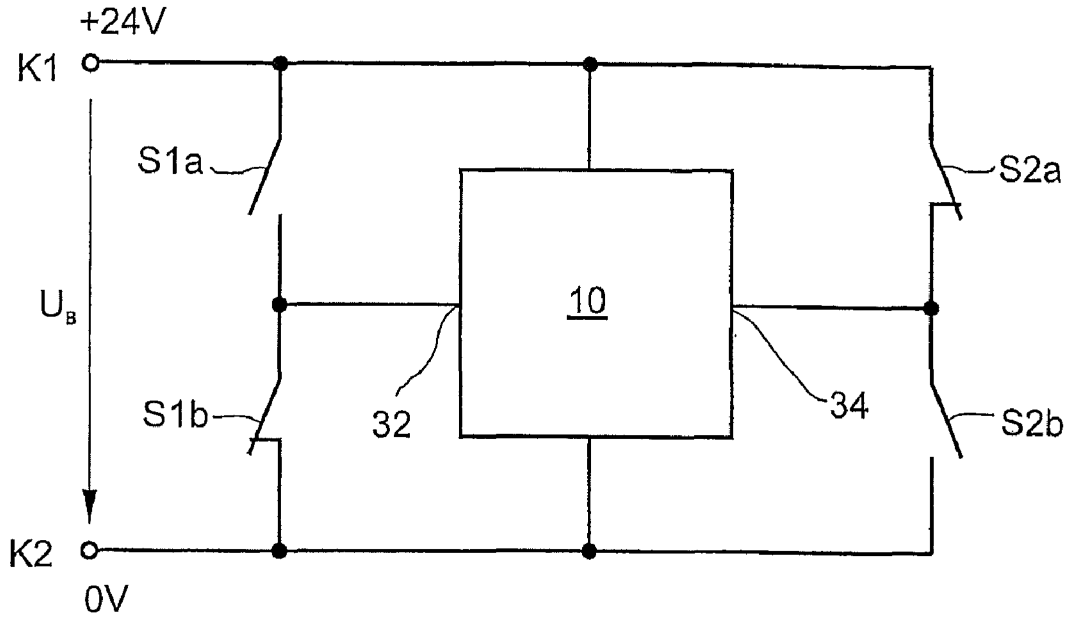
FIG. 3 shows a simplified illustration of FIG. 2 as a block circuit diagram.

In order to explain the mode selection device 74, reference is now made to FIG. 3. The same reference symbols denote the same elements as before.

The safety switching apparatus 10 is in this case merely illustrated as a block.

As has already been explained above, the following state sequence can be identified at the first port 32 if the first signaling element 18 is moved over from the unactuated state to the actuated state: 0 volt, high resistance, 24 volts. This sequence for the second element 20 is as follows: 24 volts, high resistance, 0 volt. When changing the signaling elements 18, 20 from the actuated state to the unactuated state, these sequences in each case take the reverse form.

Figure 4:
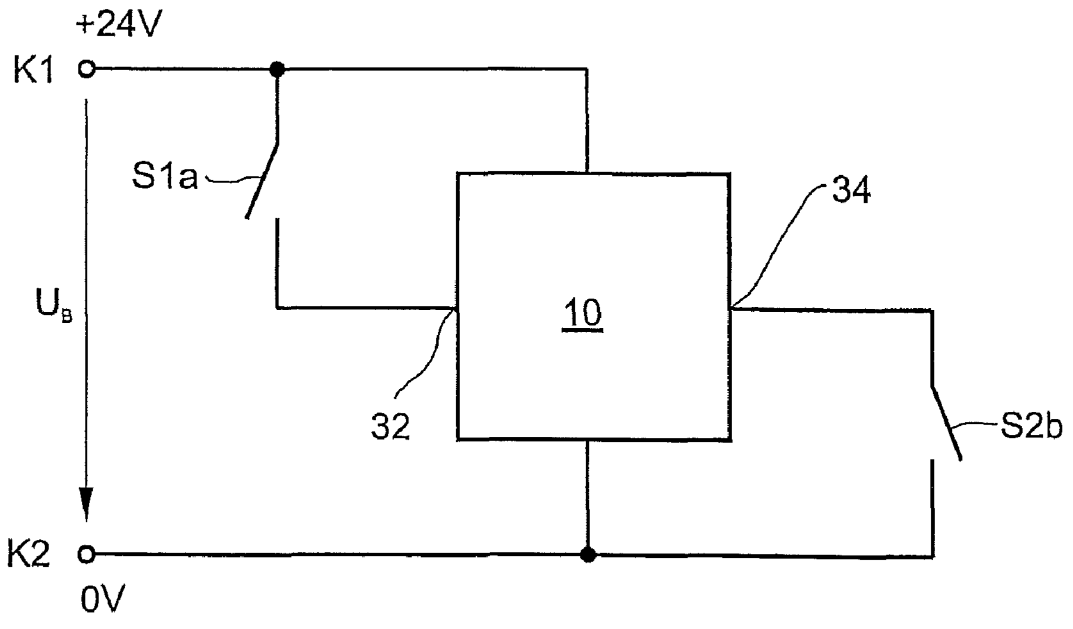
FIG. 4 shows the alternative use of signaling devices of a different type.

If FIG. 4 is now considered, in which the signaling elements 18, 20 are each equipped only with one normally open contact S1*a*, S2*b*, the first port 32 changes from a high-resistance state to 24 volts when the signaling element 18 is actuated. The second port 34 correspondingly changes from high resistance to 0 volt. If the signaling elements 18, 20 are no longer actuated, the two ports 32, 34 change back to the high-resistance state.

By means of the mode selection device 74 it is now possible to set in advance which type of signaling elements 18, 20 are connected to the safety switching apparatus 10. Thus, the microcontrollers 56, 58 expect a certain sequence on actuation or release of the signaling elements 18, 20. If the actually determined sequence deviates from the expected sequence, this can be output as a fault and the load 22 can be prevented from being switched on. If, for example, the mode selection device 74 has been configured in such a way that a combination of normally closed contacts and normally open contacts is expected as the signaling element 18, 20, but in fact signaling elements 18, 20 as shown in FIG. 4 are connected, in the rest state a high-resistance state is unexpectedly displayed at the ports 32, 34. The safety switching apparatus 10 can then respond to this.

The mode selection device 74 can also be used, however, to detect the type of signaling elements 18, 20 connected. For this purpose, for example, a first configuration step can be provided, in which the operator actuates the signaling elements 18, 20 and then releases them. Using the specific sequence which results in this case, it is possible to determine which type of signaling elements 18, 20 they are. The type determined in the configuration step can then be latched in such a way that subsequent changes in the sequence are not identified as a new configuration but as a fault event. The mode selection device 74 therefore at the same time provides a further mechanism for fault identification.

The invention claimed is:

1. A safety switching apparatus for safely switching on and off an electrical load, in particular an automated installation, comprising:

a first port connected to a first manually-actuable signaling element;

a second port connected to a second manually-actuable signaling element;

a first power switching device comprising a first switching activator operatively coupled to first switching contacts for controlling the opening and closing of said first switching contacts;

a second power switching device comprising a second switching activator operatively coupled to second switching contacts for controlling the opening and closing of said second switching contacts;

said first and second switching contacts being connected in series for controlling the application of power to the automated installation; and a timing control circuit connected to said first and second manually-actuable signaling elements and to said first and second switching activators for energizing said first and second switching activators if the time between the actuation of said first and second manually-actuable signaling elements is less than a predetermined maximum duration;

wherein said timing control circuit includes a first solid-state switching element connected in series with said first switching activator for controlling the energization of said first switching activator, a second solid-state switching element connected in series with said second switching activator for controlling the energization of said second switching activator, and a first microcontroller connected to said first and second ports and to said first and second solid-state switching elements and configured to detect said actuations of said first and second manually-actuable signaling elements and enable said first and second solid-state switching elements when the time between said actuations is less than said predetermined maximum duration.

2. The safety switching apparatus of claim 1, wherein a first current path for activating said first switching activator is routed via said first port in such a way that said first port for activating said first switching activator needs to be switched to a low resistance.

3. The safety switching apparatus of claim 2, wherein said first signaling element has at least one first normally open contact and a first normally closed contact, with, in a rest state, said first normally open contact being opened, said first normally closed contact being closed and, in an activated state, said first current path being routed via said first normally open contact.

4. The safety switching apparatus of claim 1, wherein a first switching indicator is associated with said first switching device and a second switching indicator is associated with said second switching device, with a respective state of said first switching indicator and said second switching indicator being monitored by said first microcontroller in order to determine a discrepancy between an expected state of said first and second switching devices and an actual state of said first and second switching devices.

5. The safety switching apparatus of claim 1, wherein said first microcontroller has a monitoring input for signaling a state of said load and for identifying a fault event in said load.

6. The safety switching apparatus of claim 1, further comprising a redundant, second microcontroller, which is configured to interact with said first microcontroller in such a way that an activation of said first and second switching activators only takes place when said second microcontroller, too, has determined that said maximum duration is undershot.

7. The safety switching apparatus of claim 6, wherein a third switching element is connected in series with said first switching activator and a fourth switching element is connected in series with said second switching activator, said third and fourth switching elements being driven by said second microcontroller.

8. The safety switching apparatus of claim 3, wherein said second signaling element has at least one second normally closed contact and a second normally open contact, with, in a rest state, said second normally closed contact being closed, said second normally open contact being open and, in an activated state, a second current path being routed via said second normally open contact, said first normally open contact allowing to make a first connection to a first voltage potential, and said second normally open contact allowing to make a second connection to a second voltage potential.

9. The safety switching apparatus of claim 1, further comprising a mode selection device for setting an operating mode of said safety switching apparatus as a function of a type of said first and second signaling elements.

10. The safety switching apparatus of claim 9, wherein said first microcontroller is designed to detect a type of signaling elements.

11. The safety switching apparatus of claim 1, wherein said first solid-state switching element is connected in series with said first switching activator between said first port and a first power source terminal, and said second solid-state switching element is connected in series with said second switching activator between said second port and a second power source terminal, and further wherein the potential at said first power source terminal is different from the potential at said second power source terminal.

12. The safety switching apparatus of claim 11, wherein said first manually-actuable signaling element is connected between said first port and said second power source terminal and said second manually-actuable signaling element is connected between said second port and said first power source terminal.

13. The safety switching apparatus of claim 12, wherein said first and second manually-actuable signaling elements comprise normally-open contacts that are closed upon actuation.

14. The safety switching apparatus of claim 1, wherein said first and second switching activators comprise relay coils or solenoids.

* * * * *